United States Patent
Eggert

[11] 3,922,034
[45] Nov. 25, 1975

[54] ARMORED HEADREST

[75] Inventor: Walter S. Eggert, Huntingdon Valley, Pa.

[73] Assignee: The United States of America as represented by the Secretary of the Navy, Washington, D.C.

[22] Filed: Apr. 9, 1975

[21] Appl. No.: 566,465

Related U.S. Application Data

[63] Continuation-in-part of Ser. No. 418,338, Nov. 23, 1973, abandoned.

[52] U.S. Cl. ............... 297/216; 297/390; 297/391; 2/10
[51] Int. Cl.² ..................... A47C 7/38; B60R 21/10
[58] Field of Search .......... 297/391, 404, 410, 390, 297/291, 299, 384, 216; 248/419, 421; 2/9, 10; 244/122 R, 122 AF, 122 AG

[56] References Cited
UNITED STATES PATENTS

| | | | |
|---|---|---|---|
| 2,302,231 | 11/1942 | Lobelle | 2/10 |
| 2,796,920 | 6/1957 | Cowles | 297/291 |
| 2,959,382 | 11/1960 | Turner | 244/122 AG |
| 3,262,716 | 7/1966 | Graham | 297/390 X |
| 3,376,064 | 4/1968 | Jackson | 297/391 |
| 3,380,073 | 4/1968 | McLaughlin | 2/10 |
| 3,420,475 | 1/1969 | Castillo | 297/216 X |
| 3,574,398 | 4/1971 | Hairgrove | 297/410 |
| 3,581,620 | 6/1971 | Hauck | 244/122 R |
| 3,767,259 | 10/1973 | Blake | 297/216 |

*Primary Examiner*—Francis K. Zugel
*Attorney, Agent, or Firm*—R. S. Sciascia; R. E. O'Neill

[57] ABSTRACT

A headrest for airplane seats, and more particularly for helicopters which provide crash protection to the pilot by the use of a resilient pivotal coupling between a headrest supporting member and the headrest assembly itself. An integrally attached, rapidly movable visor is provided which is movable from a first position wherein it does not restrain the pilot's head to a second position where it does restrain the pilot's head, at the same time the headrest provides visibility and armored protection completely around the pilot's head.

1 Claim, 6 Drawing Figures

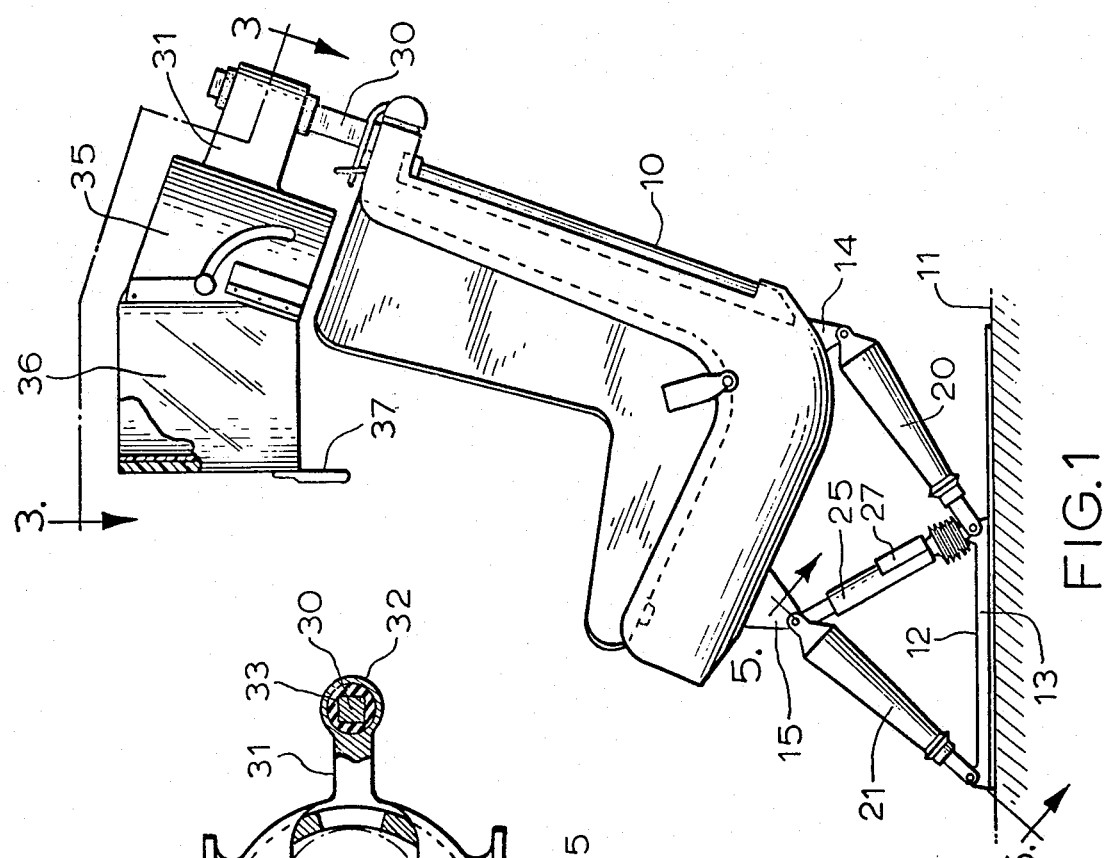
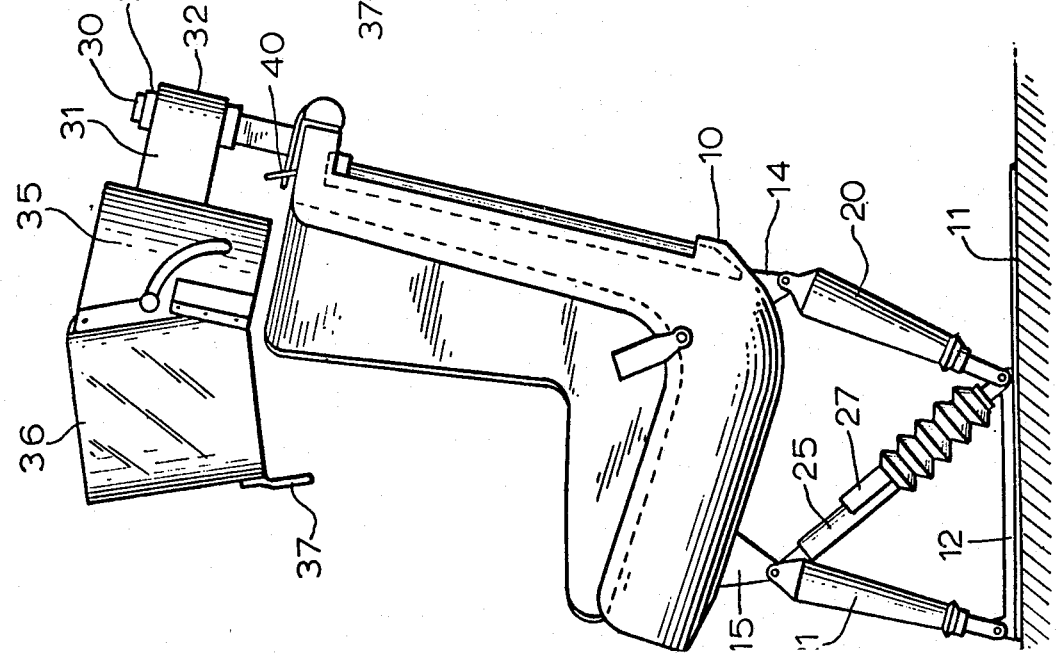

ARMORED HEADREST

This is a continuation-in-part of application Ser. No. 418,338, filed Nov. 23, 1973, now abandoned. The invention described herein may be manufactured and used by or for the Government of the United States of America for governmental purposes without the payment of any royalties thereon or therefor.

A literature search and personal interviews conducted have established design parameters for armored helicopter seats and headrests. These investigations produced data on the properties of various armors and their manufacturing techniques, statistical data on the exposure of a pilot to enemy fire both from the standpoint of caliber and direction of fire, and the requirements of crash attenuation. The design parameters were used to develop a lightweight seat concept with incorporated headrests which features attenuation of crash loads and considerably more armor protection than is presently being provided.

There is a need for increased armor protection for helicopter pilots who participate in combat missions. The problem is to provide adequate protection without sacrifice of vehicle mission capability. A requirement of the seat and headrest is the capability to attenuate the high impulsive loads of a crash. The study has included armor protection needs based upon casualty information, review of available armor materials, and combining them into conceptual designs of a lightweight seat and headrest which has crash attenuation capability. Human tolerance to crash impulse has been studied by many investigators. These studies are summarized in the U.S. Army's Crash Survival Design Guide. It has been learned that humans can survive amazingly high accelerations but only for short periods of time. The decision whether to design the crash attenuation device for an armored or unarmored seat and headrest is based on circumstances surrounding a crash. Even if these crashes occur with the seat unarmored, it is more important that the pilot not be disabled in unfriendly territory because quick egress from the helicopter after crash is necessary as the ship is likely to be subject to enemy fire.

It is therefore an object of this invention to provide an improved crash attenuation headrest for pilots including a back portion mounted on a headrest support member coupled to a seat thru a resilient pivotal coupling for providing lateral crash attenuation by rotation motion of the resilient pivotal member.

It is yet a further object of this invention to provide an improved crash attenuation headrest wherein there is provided a visor rapidly movable from a first position of known pilot restraining location to a second pilot restraining position and at the same time providing visual and armored protection.

Still a further object of this invention is to provide an improved armored headrest system for incorporation within an armed helicopter seat comprising, a support member attached to the back of a helicopter seat, a neck portion, a resilient pivot coupling the neck portion to the tube portion, a headrest attached to the neck portion, a transparent armored visor pivotably mounted to the headrest, a layer of Lexon bonded to the inside of the armor, the armored headrest system capable of rotating angularly about the tube on the resilient pivot and in conjunction with a helmet worn by the pilot absorbing forward and backward blows during crashes.

Other objects, advantages and novel features of the invention will become apparent from the following detailed description of the invention when considered in conjunction with the accompanying drawings wherein:

FIG. 1 is a side view of a helicopter seat and headrest in a first position;

FIG. 2 is a side view of the helicopter seat and headrest in a second position;

FIG. 3 is a section view along lines 3—3 in FIG. 2, showing the headrest in detail;

A single piece of armored plate material is formed into seat 10 and shown in FIGS. 1 and 2 in a first and second extreme position respectively. The first position corresponds to a rear-most or lower position to accommodate shorter pilots, whereas the second position corresponds to a forward-most or higher position which is for the accommodation for taller pilots. The seat 10 is shown mounted to a frame member 11 of a helicopter by way of channel irons in any well known manner. Mounting of the seat to the channel irons is effected by the use of strut mounting flanges 14, 15 and 17. A fourth strut (not shown) comparable to strut flange 14, is employed on the other side of the seat 10.

Figure 4:
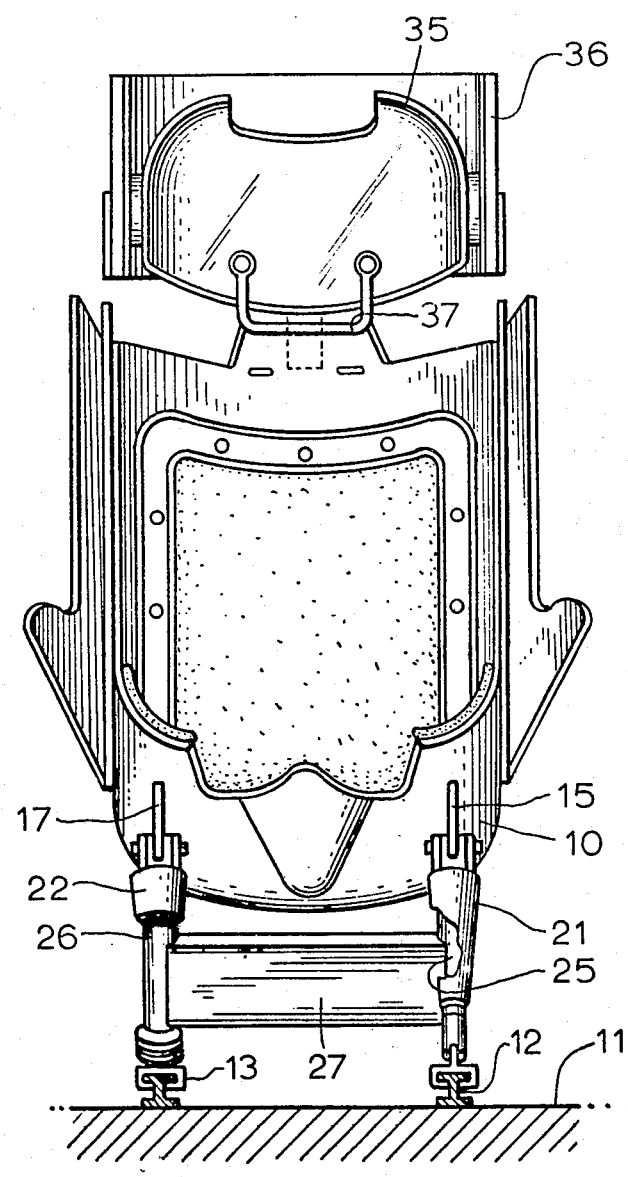
FIG. 4 is a front view of the seat and headrest.
Figure 5:
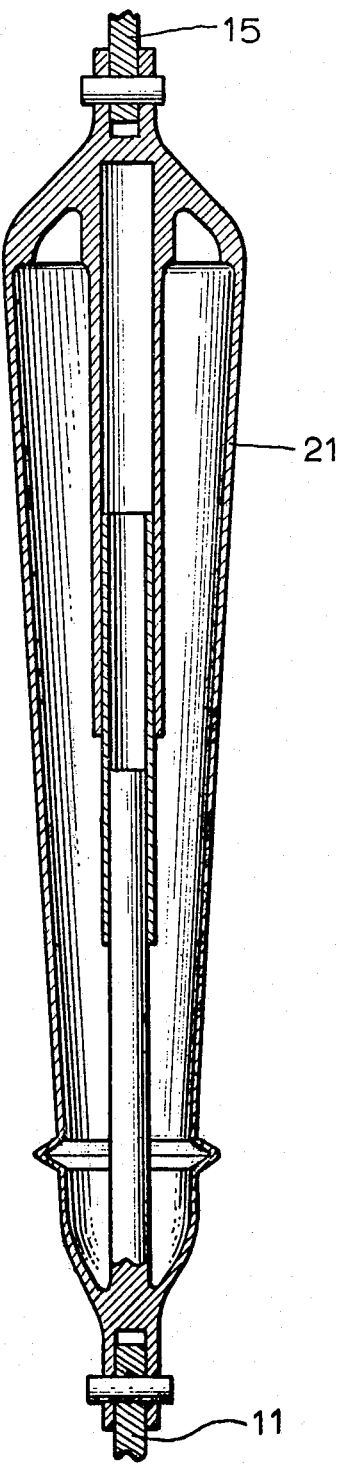
FIG. 5 is a detailed view of a crash attenuating strut.

Three struts 20, 21, and 22 are pivotably mounted to flange members 14, 15, and 17 respectively and to the base flanges 12 and 13. The fourth strut (not illustrated) is connected in a manner similar to strut 20 and is pivotably connected to flange 13. Each of these four struts has a cross section as illustrated in FIG. 5. Two variable cross struts 25 and 26 are shown in two positions which represent the extended (FIG. 2) and shortened link (FIG. 1) to raise and lower the seat 10. The variable cross struts may be motorized so that the pilot is able to remotely control the height of the seat to suit his comfort. A connecting plate like member 27 connects the two adjustable struts and can if desired provide additional armored protection to the pilot.

Mounted to the upper back of the seat is member 30 having a rectangular cross section. An armored neck portion 31 has a cylindrical member 32 which encompasses member 30 and is separated by a resilient pivotable portion made of resilient material 33. The resilient material may be constructed of either hard rubber or urethane. The use of this material provides for a rotating or pivotable motion about the tubular member 30. The resilient material 33 allows a headrest lateral rotation of approximately 15°. The neck portion 31 integrally supports a back headrest 35 and has mounted thereon for pivotal motion a transparent armored resistant visor 36 having a handle 37. Additionally, the visor includes an inner layer of Lexon 38. The back headrest 35 is made of dual hardness steel which acts as protection to the pilot. The entire headrest assembly may be adjustably mounted on seat 10 for vertical motion by a nut-bolt-slide arrangement located at 40.

When the transparent visor is closed (moved downwardly towards the seat pan) the inner portion of the headrest 35 and the inner part of visor 36 restrain the helmet from movement other than the small amount allowed by the twisting of the headrest assembly about rectangular member 30.

Figure 6:
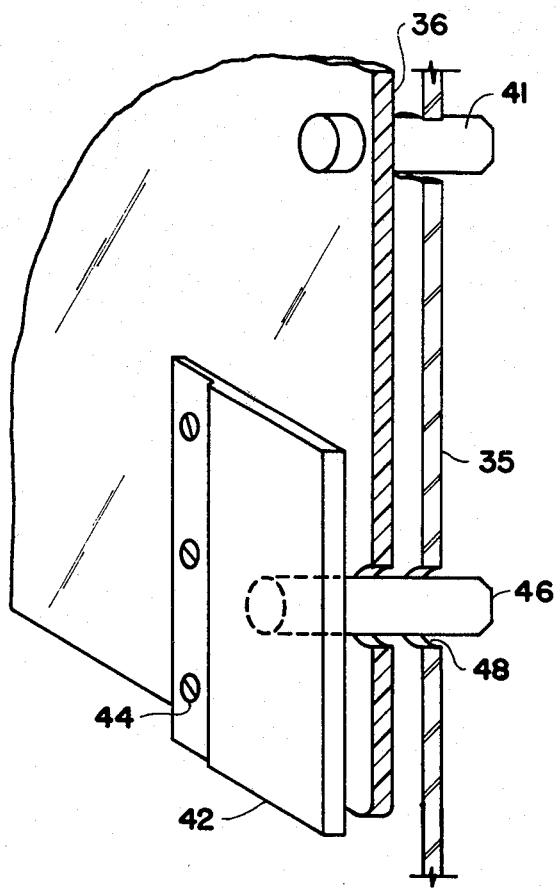
FIG. 6 is a cross sectional view of the headrest assembly and visor assembly shown in FIG. 1.

Referring to FIGS. 1 and 6, visor 36 pivots about the lower portion thereof at pin 46 which is mounted on the visor 36 by removable flat plate 42. Flat plate 42 is rigidly affixed to visor 36 by the use of screws 44. Pin 46 is connected to plate 42 in any suitable manner and projects thru visor 36 and into a hole 48 on back headrest 35, wherein the visor is rotatable by the pilot over his head by handle 37 at his discretion. Visor 36 then pivots around pin 46, and pin 41 is made to follow arcuate groove 43 which is located in the back plate 35.

Items identical to arcuate groove 43, pin 46, pin 41 and plate 42 are also located on the opposite side of back headrest 35 but are not shown in FIGS. 1 and 6.

As previously stated the headrest support tube 30 is attached to the seat 10 by the nut-bolt-slide arrangement 40 which allows for vertical adjustment of the headrest. Tube 30 may be connected to the seat 10 thru a hinge 45 and a load limiting device not shown. The hinge and load limiting device allows forward movement of the headrest with controlled resistance in a crash situation after the pilot's head strikes visor 36. The forward motion is limited to hinge 45 at approximately 10° after which the pilot's head is completely restrained.

The headrest system is designed to be used with the standard Navy helmet to further protect the pilot's head. A thickness of energy absorbing foam padding may be added to the front of the helmet to soften the impact against the visor during a crash. Also, more padding could be added to the sides of the helmet to protect against lateral impact.

Obviously many modifications and variations of the present invention are possible in the light of the above teachings. It is therefore to be understood that within the scope of the appended claims the invention may be practiced otherwise than as specifically described.

I claim:
1. An improved removable armored headrest system for an armoved helicopter chair comprising;
   a. a chair having a seat portion and a back support portion;
   b. a support member movably attached to said back portion of said chair; said support member having a substantially elongated tubular shape and having a rectangular end section extending a substantial distance above said back support position of said chair;
   c. a neck member having first and second end portions, said first end portion formed into a hollow cylindrical member to completely enclose and extend a substantial distance along said rectangular end of said support member, said second end portion formed into a wye shaped member to extend in a forward direction from said back support portion;
   d. resilient material in intimate contact with external surfaces of said rectangular end section, said resilient material extending completely within said hollow cylindrical member for forming a resilient pivot coupling between said hollow cylindrical member and said rectangular end section;
   e. a headrest having first and second side portions attached to said second end wye shaped member; and,
   f. a transparent armored visor pivotably mounted to said first and second side portions of said headrest, said visor pivoting from an open position having no constraints upon a pilot's helmet to a closed position having constraints applied to movement of a pilot's head; whereby the resilient material permits the headrest to rotate angularly about the support member and allows absorbing of forward, sideway and backward blows during crashes.

* * * * *